Patented Mar. 11, 1924.

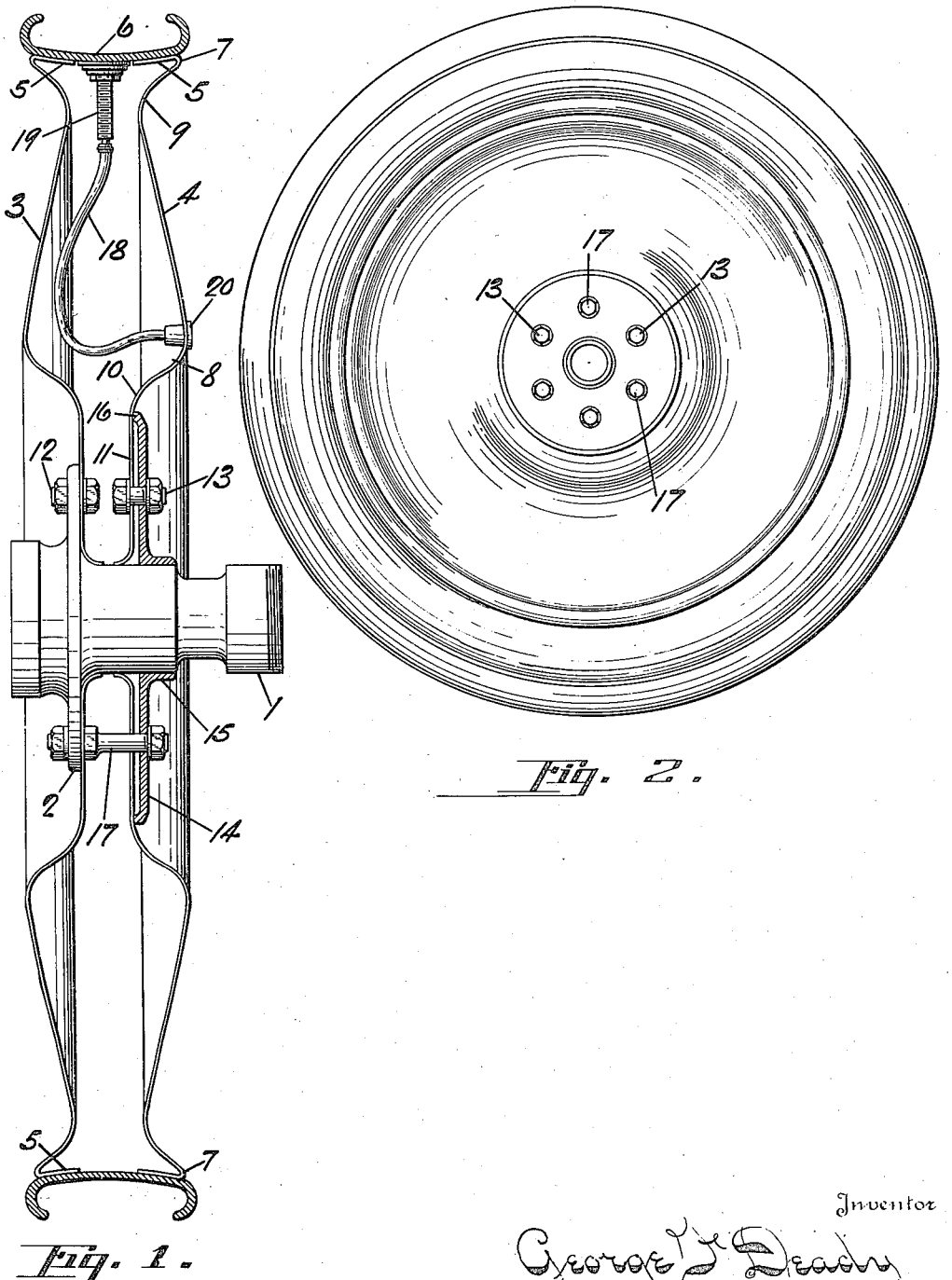

1,486,832

UNITED STATES PATENT OFFICE.

GEORGE F. DEADY, OF DAYTON, OHIO, ASSIGNOR TO THE DAYTON DISC WHEEL COMPANY, OF DAYTON, OHIO, A CORPORATION OF OHIO.

VEHICLE WHEEL.

Application filed June 6, 1922. Serial No. 566,248.

*To all whom it may concern:*

Be it known that I, GEORGE F. DEADY, a citizen of the United States, residing at Dayton, in the county of Montgomery and State of Ohio, have invented certain new and useful Improvements in Vehicle Wheels, of which the following is a specification.

My invention relates to vehicle wheels and more particularly to wheels of the disc type.

The object of the invention is to simplify the structure as well as the means and mode of assembly of such wheels whereby they will not only be cheapened in construction, but will be more efficient in use, easily and quickly assembled and disassembled and unlikely to get out of repair.

A further object of the invention is to provide an improved form or contour for such disc wheels whereby they will be enabled to stand severe shocks and strains, and while not a wheel of the so-called resilient type will have sufficient resiliency to compensate for shock.

A further object of the invention is to provide a disc wheel structure which may be cheaply and economically manufactured to be mounted upon a standard automobile hub of a well known type.

A further object of the invention is to provide improved means for detachably engaging the tire rim with the disc, and to afford improved means for engaging the discs one with the other and with the hub.

With the above primary and other incidental objects in view as will more fully appear in the specification, the invention consists of the features of construction, the parts and combinations thereof, and the mode of operation or their equivalents as hereinafter described and set forth in the claims.

Referring to the accompanying drawings, Fig. 1 is a vertical sectional view of the assembled disc wheel structure, embodying the present invention. Fig. 2 is a side elevation of the wheel viewed from the outside.

Like parts are indicated by similar characters of reference thoughout the several views.

In the accompanying drawings, 1 is a standard automobile wheel hub of well known and popular manufacture. This hub, which in the present instance, is that of the front wheel, is provided with an integral peripheral flange 2. The hub of the rear wheel is of similar construction, except that the flange 2 is flanged laterally, at its periphery to form a brake housing. Such hub construction forming no part of the present invention per se is not illustrated. Mounted upon the hub 1 in spaced relation with each other are two relatively adjustable sheet metal discs 3 and 4. These discs 3 and 4 are of identical shape or contour, in order to economize manufacturing costs. While such identities of contour or shape is desirable, it is not necessary. However, by employing identical discs, the cost of manufacture may be reduced by producing both the inner and outer discs from the same die, and assembling them in reverse relation as is shown in Fig. 1. These discs 3 and 4 are provided with inturned marginal flanges 5, tapering slightly inwardly and adapted for wedging engagement within the inner circumference of an annular tire rim 6. It is to be noted that these flanges do not engage the lateral side of the rim 6, but are located wholly within the side planes of the rim. Upon adjustment of the discs one toward the other, the inturned tapered flanges 5 which converge slightly inwardly exert outward expanding or radial pressure within the surrounding annular tire rim 6. The discs may be variously contoured or dished to varying degree and to afford different designs. The preferred form of disc as illustrated in the drawing is provided with an annular depression 7 in its exterior face and adjacent to its peripheral margin. The exterior face of the central portion of the disc bounded by such depression is bulged into a truncated conical form of low pitch, which merges easily into the depression 7. Such truncated conical portion is abruptly depressed at its apex to form a crater like concavity 10. This central concentric depression or exterior recess 10, has a substantially flat bottom or web 11, lying in a plane perpendicular to the axis of the wheel. The depression or cavity 10 is of considerable depth, so that the like central portions of the respective discs are brought into comparatively close relationship one with the other. The oppositely tapered or double convex portions 8 of the discs afford a lateral bracing effect of the wheel as a whole, while the contracted central area or approach of the depressed portion 10 of the respective discs, affords a limited degree of lateral resiliency, which will compensate for shock and so relieve the wheel of severe strains and stresses. The discs are provided with central openings, which fit fairly close upon the barrel of the hub 1, the margins of such openings being preferably inturned in an arcuate or flaring contour. This inturned margin serves to further stiffen the disc at a central point.

The innermost disc is fixedly connected to the hub flange 2 by being bolted, riveted or otherwise, as at 12. These rivets, bolts or other connections are located at spaced intervals. The outermost disc of the pair is adjustable upon the hub relative to the inner disc. Engaged with the outer disc by means of bolts, rivets or other suitable connections as at 13, is a collar 14, having a central hub 15, fitting the barrel of the main hub 1, and having a lateral peripheral bead 16, which bears upon the disc in a circular line, removed from the hub. Both the hub flange 2 and the disc 14 are seated within the central concave areas, or depressions 10. Both the flange 2 and the collar 14, are fixedly connected to their respective discs at spaced intervals by the interconnecting bolts or rivets. There is further provided a plurality of interconnecting studs 17 located at spaced intervals preferably alternating with the bolts or rivets 12 and 13, which serve to connect the flange 2 of the hub with the collar 14, serving to draw the collar toward the hub flange and so adjust the discs 3 and 4 one toward the other. This relative adjustment of the discs wedges the peripheral flanges 5 of the discs into firm engagement within the annular tire rim 6, and at the same time opposes the tension of one disc against that of the other to form a braced, strain resisting unitary structure. By applying the pressure of the collar 14 to the adjacent disc upon a circular line of considerable diameter in spaced relation with the hub, the bracing is materially increased. The adjustment of the discs 3 and 4 one toward the other under the influence of the clamp studs 17, is limited by the engagement of the peripheral flanges 5 with the tire rim 6. While the discs do not contact one with the other throughout their central area, they approach quite closely, due to the inward projection of the central concave areas 10.

Any suitable or convenient means may be employed for inflating the tire upon the rim. In the present instance, a flexible hose connection 18 is provided intermediate the discs 3 and 4 leading from the usual valve stem 19, to a connection 20 in one of the discs, through which connection may be made with the source of air under pressure.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. In a vehicle wheel, a pair of oppositely disposed discs spaced apart, the outer faces of the discs being convex but having external concave central depressions, inturned peripheral flanges on the discs converging slightly inwardly, an annular rim, said flanges having a wedging engagement within the inner circumference of the annular rim, a flanged hub extending centrally through the discs with its flange bearing against the outer face of one disc within the central concave depression thereof, bolts connecting the hub flange to the adjacent disc independent of the opposite disc, a collar surrounding the hub and bearing against the outer face of the other disc within the external concave depressions thereof, bolts connecting said collar to the adjacent disc independent of the opposite disc and a plurality of additional bolts extending through both discs and connecting the hub flange and the collar by the adjustment of which the discs are drawn one toward the other to force the tapered flanges of the disc deeper within the annular rim upon which they exert radial expanding pressure, substantially as specified.

2. A vehicle wheel element, comprising a disc, an inwardly converging peripheral flange upon the disc, an annular depression formed in the face of the disc in proximity to the margin thereof, the exterior face of the central portion of the disc being bulged into a truncated conical form merging into said annular depression, the central area of the truncated conical portion being abruptly depressed to form a concentric exterior concavity, the bottom of which is substantially flat and in a plane perpendicular to the axis of the disc, substantially as specified.

3. In a vehicle wheel, a pair of oppositely disposed discs of identical shape, and an inwardly converging peripheral flange on each disc, an annular rim engaged by said flanges, the discs being exteriorly convex to a circular line mid distance between the center and margin of the disc, the central portions of the discs being exteriorly concaved into approximate relation one with the other, the bottom of said central concavities being in planes substantially parallel and perpendicular to the axis of the wheel, and clamp collars seated within the exterior central concavities of the respective discs, said collars being independently connected with the respective discs, and a plurality of spaced adjusting studs connecting the clamp collars one with the other to relatively adjust the discs to wedge the converging marginal flanges within the annular rim, substantially as specified.

4. In a vehicle wheel, a pair of oppositely disposed spaced discs relatively adjustable in relation with each other, and an annular rim detachably engaged by the margins of the discs upon relative adjustment of the discs, a flanged hub upon which said discs are mounted with one of said discs bearing against said hub flange, a collar surrounding the hub, on the outer side of the other disc, said collar having a lateral annular bead at approximately the margin of said collar bearing against the exterior face of the disc, and clamp members connecting the hub flange and collar at spaced intervals to relatively adjust said discs, the pressure of said collar upon the disc being upon a circular line removed from the hub due to the engagement of the annular bead with the face of the disc.

5. In a vehicle wheel, a flanged hub, two relatively adjustable discs mounted upon said hub and spaced apart, an annular rim surrounding the discs and engaged thereby, a clamp collar surrounding the hub at the outer side of the disc farthest removed from the hub flange, and a plurality of adjustable clamp bolts connecting the hub flange and the collar tending to draw said discs one toward the other, the discs being maintained in spaced relation against the tension of said clamp bolts by the engagement of the peripheries of the discs with said annular rim.

6. In a vehicle wheel a pair of identically shaped discs disposed in oppositely facing spaced relation, marginal flanges on said discs converging each toward the other, a tire rim surrounding the flanges of both discs, within which the disc flanges exert internal expanding pressure upon the adjustment of the discs one toward the other, and adjustable tie means between the discs for effecting such adjustment.

In testimony whereof, I have hereunto set my hand this 13th day of May, A. D. 1922.

GEORGE F. DEADY.

Witnesses:
HENRY F. NOLAN,
GEORGE C. HELMIG.